US012630143B2

(12) United States Patent
Park et al.

(10) Patent No.: US 12,630,143 B2
(45) Date of Patent: **\*May 19, 2026**

(54) HYBRID ELECTRIC VEHICLE AND CONTROL METHOD THEREOF

(71) Applicants:Hyundai Motor Company, Seoul (KR); Kia Corporation, Seoul (KR)

(72) Inventors: Sun Young Park, Gyeonggi-do (KR); Sung Deok Kim, Gyeonggi-do (KR); Joon Young Park, Seoul (KR); Dae Ro Park, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 226 days.

This patent is subject to a terminal disclaimer.

(21) Appl. No.: 17/986,059

(22) Filed: Nov. 14, 2022

(65) Prior Publication Data

US 2023/0365116 A1     Nov. 16, 2023

(30) Foreign Application Priority Data

May 12, 2022    (KR) ........................ 10-2022-0058497

(51) Int. Cl.
B60W 20/10          (2016.01)

(52) U.S. Cl.
CPC ..... B60W 20/10 (2013.01); B60W 2510/0208 (2013.01); B60W 2510/0638 (2013.01); B60W 2510/081 (2013.01); B60W 2510/1005 (2013.01)

(58) Field of Classification Search
CPC ......... B60W 20/10; B60W 2510/0208; B60W 2510/0638; B60W 2510/081; B60W 2510/1005
See application file for complete search history.

(56) References Cited

U.S. PATENT DOCUMENTS

| | | | | |
|---|---|---|---|---|
| 10,336,332 B2 * | 7/2019 | Kobayashi | ............ | B60W 10/10 |
| 10,479,346 B2 * | 11/2019 | Park | ......................... | B60K 6/48 |
| 10,487,790 B1 * | 11/2019 | Siddiqui | ................ | B60W 10/11 |
| 10,781,783 B1 * | 9/2020 | Kim | ...................... | F02N 11/103 |
| 2004/0084002 A1 * | 5/2004 | Mitsutani | ................ | F02N 11/04 |
| | | | | 123/179.4 |

(Continued)

FOREIGN PATENT DOCUMENTS

| | | |
|---|---|---|
| JP | 2015-174557 A | 10/2015 |
| JP | 2018-070107 A | 5/2018 |

(Continued)

*Primary Examiner* — Dale W Hilgendorf
*Assistant Examiner* — Hana Lee
(74) *Attorney, Agent, or Firm* — Fox Rothschild LLP

(57) ABSTRACT

Disclosed are a hybrid electric vehicle having a transmission without a reverse (R) stage and capable of coping with a situation in which a connection state between a motor and an engine is unknown, and a control method thereof. The method includes, if a preset condition is satisfied in a situation where a state of an engine clutch is unknown, driving any one of a first driving source disposed at one end of the engine clutch and a second driving source disposed at the other end of the engine clutch, determining whether the other one of the first driving source and the second driving source rotates, and determining whether the engine clutch is opened depending on the determination result.

18 Claims, 8 Drawing Sheets

(56)  References Cited

U.S. PATENT DOCUMENTS

| 2005/0082096 | A1* | 4/2005 | Oono | .................... | F16H 63/483 |
| | | | | | 903/910 |
| 2015/0375610 | A1* | 12/2015 | Okubo | ................... | B60K 6/547 |
| | | | | | 903/902 |
| 2016/0272195 | A1 | 9/2016 | Hirasawa | | |
| 2017/0137020 | A1* | 5/2017 | Kawanishi | .......... | B60L 15/2009 |
| 2020/0114902 | A1* | 4/2020 | Kim | ...................... | B60W 10/06 |
| 2025/0327515 | A1* | 10/2025 | Fujimoto | .............. | F16H 57/043 |

FOREIGN PATENT DOCUMENTS

| KR | 101964771 B1 | 4/2019 |
| KR | 102175960 B1 | 11/2020 |
| KR | 10-2021-0060696 A | 5/2021 |

\* cited by examiner

-Prior Art-

-Prior Art-

-Prior Art-

HYBRID ELECTRIC VEHICLE AND CONTROL METHOD THEREOF

CROSS REFERENCE TO RELATED APPLICATION

The present application claims under 35 U.S.C. § 119(a) the benefit of and priority to Korean Patent Application No. 10-2022-0058497, filed May 12, 2022, the entire contents of which is incorporated herein for all purposes by this reference.

BACKGROUND

1. Technical Field

The present disclosure relates to a hybrid electric vehicle having a transmission without a reverse (R) stage and capable of coping with a situation in which a connection state between a motor and an engine is unknown, and a control method thereof.

2. Background

Recently, as interest in the environment increases, the development of eco-friendly vehicles is also being actively carried out. Representative examples of eco-friendly vehicles include electric vehicles (EVs) and hybrid electric vehicles (HEVs).

The hybrid electric vehicle (HEV) generally refers to a vehicle that uses two power sources together, and the two power sources are mainly an engine and an electric motor. These hybrid vehicles are being developed in recent years because they have excellent fuel efficiency and power performance as well as advantages in reducing exhaust gas compared to vehicles having only an internal combustion engine.

Such a hybrid electric vehicle may operate in two driving modes depending on which power train is driven. One driving mode is an electric vehicle (EV) mode, which is driven only with an electric motor, and the other driving mode is a hybrid electric vehicle (HEV) mode, in which an electric motor and an engine are operated together to obtain power. Hybrid electric vehicles perform switching between the two driving modes according to driving conditions. Such switching between driving modes is generally performed for the purpose of maximizing fuel efficiency or driving efficiency according to the efficiency characteristics of the power train.

FIG. 1 illustrates an example of a power train structure of a general hybrid electric vehicle.

In FIG. 1, a power train structure of a hybrid electric vehicle to which a parallel type (or transmission mounted electric drive (TMED) type) method is applied is illustrated.

Referring to FIG. 1, an electric motor (or a driving motor) 140 and an engine clutch (EC) 130 are disposed between an internal combustion engine (ICE) 110 and a transmission 150.

In such a vehicle, in general, when a driver steps on an accelerator after starting, the motor 140 is first driven using the power of a battery is a state in which the engine clutch 130 is opened, and the power of the motor is transmitted to wheels through the transmission 150 and a final drive (FD) 160 to move the wheels (i.e., EV mode). When the vehicle is gradually accelerated and requires a greater driving force, a start-up generator motor 120 may operate to drive the engine 110.

Accordingly, when the rotational speeds of the engine 110 and the motor 140 are sufficiently close to each other, the engine clutch 130 is engaged so that the engine 110 and the motor 140 together or the engine 110 drives a vehicle (i.e., switching from EV mode to HEV mode). When a preset engine-off condition, such as vehicle deceleration, is satisfied, the engine clutch 130 is opened and the engine 110 is stopped (i.e., switching from the HEV mode to the EV mode). In addition, the hybrid electric vehicle may convert the driving force of the wheels into electric energy during braking so as to charge a battery, which is called a braking energy regeneration or regenerative braking.

Since the start-up generator motor 120 serves as a start motor upon starting of the engine and operates as a generator when the engine's rotational energy is recovered after the engine is started or when the engine is stopped, the start-up motor may be called a "hybrid starter generator (HSG)", and, in some cases, may also be called an "auxiliary motor".

However, unlike the engine 110, since the motor 140 can change the rotational direction, if a vehicle requires a reverse operation, the motor enables a driving shaft to rotate reversely without the reverse (R) stage in the transmission 150. This will be described with reference to FIGS. 2A and 2B.

FIGS. 2A and 2B are diagrams illustrating the reverse operation scheme of a hybrid electric vehicle to which a transmission having no reverse stage is applied. In FIGS. 2A and 2B, it is assumed that the hybrid electric vehicle reverses with the engine clutch opened.

Referring first to FIG. 2A, in the case of the transmission having the reverse (R) stage, when the motor 140 rotates in the forward direction (i.e., the same direction as the rotation direction of the engine), the transmission 150 converts the rotation direction to the reverse direction in the R stage so that the output stage of the transmission 150 rotates in the reverse direction.

Contrary to this, in the case where the R stage is omitted from a transmission 150' as illustrated in FIG. 2B, when the motor 140 rotates in the reverse direction, the transmission 150' rotates in the reverse direction at both the input shaft and the output shaft in a first stage. Accordingly, even if the R stage is omitted from the transmission, the reverse operation is possible in the parallel type hybrid electric vehicle, and durability and fuel efficiency can also be improved with the simple structure of the transmission 150'.

However, in a typical hybrid electric vehicle, if an unknown failure occurs in the state of the engine clutch 130, the R stage driving is not permitted. This is because during R state driving in a state of the engine clutch 130 being engaged, if the engine 110 is stopped, there is a risk that the engine 110 will rotate in reverse, and if the engine 110 is started, a vehicle can move forward in the R stage.

Accordingly, if the state of the engine clutch 130 becomes unknown, there is a problem in that even if the engine clutch 130 is actually opened, the R stage driving is impossible.

SUMMARY

Accordingly, the present disclosure has been made keeping in mind the above problems occurring in the related art, and an objective of the present disclosure is to provide a hybrid electric vehicle having a transmission without a reverse (R) stage and capable of coping with a situation in which a connection state between a motor and an engine is unknown, and a control method thereof.

The technical problems to be achieved in the present disclosure are not limited to the technical problems mentioned above, and other technical problems not mentioned will be clearly understood by those of ordinary skill in the art to which the present disclosure belongs from the description below.

In order to accomplish the above objective, according to an aspect of the present disclosure, there is provided a method of controlling a hybrid electric vehicle, the method including: driving, when a preset condition is satisfied in a situation where a state of an engine clutch is unknown, any one of a first driving source disposed at a first end of the engine clutch and a second driving source disposed at a second end of the engine clutch; determining a determination result based on whether the other one of the first driving source and the second driving source that is not being driven by the driving step rotates; and determining whether the engine clutch is opened depending on the determination result.

For example, the hybrid electric vehicle may include a transmission having no R stage gear, and the method may further include the step of prohibiting driving in the R stage gear when the engine clutch is determined to be in an unopened state.

For example, when the engine clutch is determined to be opened, the method may further include allowing driving in the R stage gear if the engine clutch is determined to be opened.

For example, the preset condition may be satisfied if: (a) the rotation speeds of the first driving source and the second driving source are able to be determined, (b) the transmission is in an N stage or P stage, and (c) a vehicle comprising the first driving source and the second driving source is stopped.

For example, the first driving source may include an engine, and the second driving source may include a driving motor, and if the engine is being driven in a state where the preset condition is satisfied, the determining step may further include: determining whether the driving motor rotates.

For example, when both the engine and the driving motor are in an off state, the driving step may further include driving the driving motor.

For example, the method may further include controlling the transmission to be in an N stage gear before driving the driving motor.

For example, the first driving source may include a first motor directly connected to the engine, and the second driving source may include a second motor connected to the transmission.

For example, the method may further include outputting the determination result about the opening state of the engine clutch in a predetermined form.

According to another aspect of the present disclosure, a non-transitory computer-readable recording medium storing a computer executable program containing instructions thereon for executing a method of controlling a hybrid electric vehicle is disclosed.

According to another aspect of the present disclosure, there is provided a hybrid electric vehicle including: an engine clutch; a first driving source disposed at a first end of the engine clutch; a second driving source disposed at a second end of the engine clutch; and at least one controller configured to, drive any one of the first driving source or second driving source if a preset condition is satisfied in a situation in which a state of the engine clutch is unknown, and to determine whether the engine clutch is in an open state based on a rotation state of the other one of the first driving source and second driving source that is not being driven.

For example, the hybrid electric vehicle may further include: a transmission having no R stage gear, wherein the at least one controller may be configured to control the transmission, wherein if the engine clutch is determined to be in an unopened state, the at least one controller may be configured to instruct the second controller to prohibit the transmission from shifting to the R stage gear.

For example, if the engine clutch is determined to be opened, the at least one controller may allow the shift to the R stage.

For example, the preset condition may be satisfied if: (a) the rotation speeds of the first driving source and the second driving source are able to be determined, (b) the transmission is in an N stage gear or P stage gear, and (c) a vehicle comprising the first driving source and the second driving source is stopped.

For example, the first driving source may include an engine and the second driving source may include a driving motor, and if the engine is being driven in a state where the preset condition is satisfied, the at least one controller may be further configured to determine whether the engine clutch is in the open state based on the rotation state of the driving motor.

For example, if both the engine and the driving motor are in an off state, the at least one controller may be further configured to drive the driving motor.

For example, the hybrid electric vehicle may further include: a transmission, wherein the at least one controller may be further configured to control the transmission, wherein the at least one controller may be configured to control the transmission to shift to the N stage gear before driving the driving motor.

For example, the first driving source may include a first motor directly connected to the engine, and the second driving source may include a second motor connected to the transmission.

For example, the hybrid electric vehicle may further include an output device that may be configured to output the determination result of the open state of the engine clutch in a predetermined form.

For example, after the shift to the R stage is permitted, the at least one controller may be further configured to re-determine whether the engine clutch is opened based on the rotation state of the first driving source in response to the driving of the second driving source.

In some embodiments, the at least one controller may comprise a first controller and a second controller. The second controller may be configured to (a) control a transmission of a vehicle and/or (b) receive instructions from the first controller regarding how to control the transmission.

According to various embodiments of the present disclosure as described above, in the hybrid electric vehicle having the transmission in which the reverse (R) stage is omitted, if the state of the engine clutch cannot be known, whether to shift to the R stage can be determined by determining the state of the engine clutch depending on the rotation state of the other of the engine and the motor while one of the engine and the motor is rotating.

In addition, the stage of the engine clutch is tracked through the continuous monitoring while allowing the R stage driving even in a situation in which the state of the engine clutch is unknown, thereby preventing reverse engine rotation or forward movement during the R stage.

It will be appreciated by those skilled in the art that the effects that can be achieved with the present disclosure are not limited to those described above and other advantages of the present disclosure will be clearly understood from the following detailed description.

BRIEF DESCRIPTION OF THE DRAWINGS

FIG. 3 illustrates an exemplary configuration of a control system of the hybrid electric vehicle according to an embodiment of the present disclosure;

FIG. 4 illustrates an exemplary operation for each control system according to an embodiment of the present disclosure;

FIG. 5 illustrates another exemplary operation for each control system according to an embodiment of the present disclosure;

DETAILED DESCRIPTION

Figure 1:
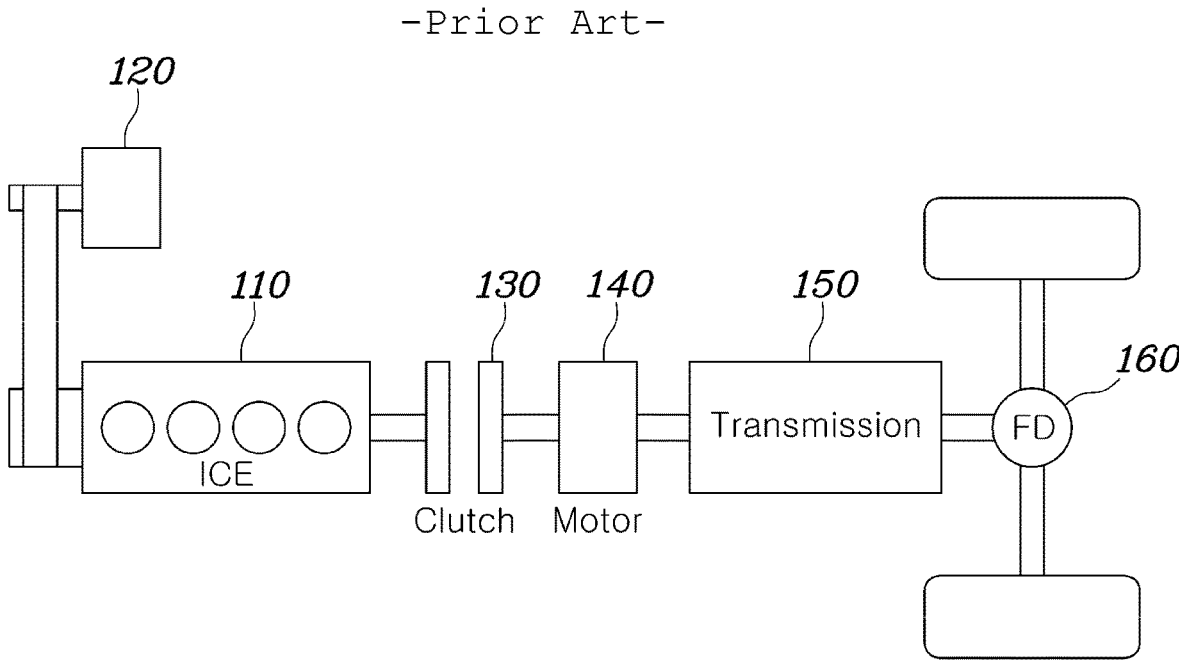
FIG. 1 illustrates an example of a power train structure of a prior art hybrid electric vehicle.

Hereinafter, embodiments disclosed in the present specification will be described in detail with reference to the accompanying drawings, wherein the same or similar components are assigned the same reference numbers, and a redundant description thereof will be omitted. The suffixes "module" and "part" for the components used in the following description are given or interchanged in consideration of only the ease of constructing the specification, and do not have distinct meanings or functions by themselves. In addition, in describing the embodiments disclosed in the present specification, if it is determined that detailed descriptions of related known technologies may obscure the gist of the embodiments disclosed in the present specification, the detailed description thereof will be omitted. In addition, the accompanying drawings are only for easy understanding of the embodiments disclosed in the present specification so that the technical spirit disclosed herein is not limited by the accompanying drawings, so the accompanying drawings should be understood as covering all changes, equivalents, or substitutes included in the spirit and scope of the present disclosure.

It will be understood that although the terms "first", "second", etc. may be used herein to describe various elements, these elements should not be limited by these terms. These terms are only used to distinguish one element from another element.

It will be understood that when an element is referred to as being "connected" or "coupled" to another element, it can be directly connected or coupled to the other element or intervening elements may be present therebetween. In contrast, it will be understood that when an element is referred to as being "directly connected" to another element, there are no intervening elements present.

As used herein, the singular forms "a", "an", and "the" are intended to include the plural forms as well, unless the context clearly indicates otherwise.

It will be further understood that the terms "comprises" and/or "comprising", or "includes" and/or "including", when used in this specification, specify the presence of stated features, integers, steps, operations, elements, components or combinations thereof, but do not preclude the presence or addition of one or more other features, integers, steps, operations, elements, components, or combinations thereof.

In addition, a unit or control unit included in the names of a motor control unit (MCU), a hybrid control unit (HCU), etc. is only a term widely used in the naming of a controller that controls a specific vehicle function, and does not mean a generic function unit. For example, respective controller may include a communication device that communicates with other controllers or sensors to control its own function, a memory that stores an operating system or logic command and input/output information, and one or more processors that perform judgement, operation, and determination necessary for controlling their own functions.

Prior to describing a driving control method of a hybrid electric vehicle according to embodiments of the present disclosure, a control system of a hybrid electric vehicle applicable to the embodiments will be first described.

FIG. 1 illustrates an example of a power train structure of a prior art general hybrid electric vehicle. In FIG. 1, a power train structure of a hybrid electric vehicle to which a parallel type (or transmission mounted electric drive (TMED) type) method is applied is illustrated. A technical discussion of the general hybrid electric vehicle of FIG. 1 is provided above in the background section.

Figure 2A:
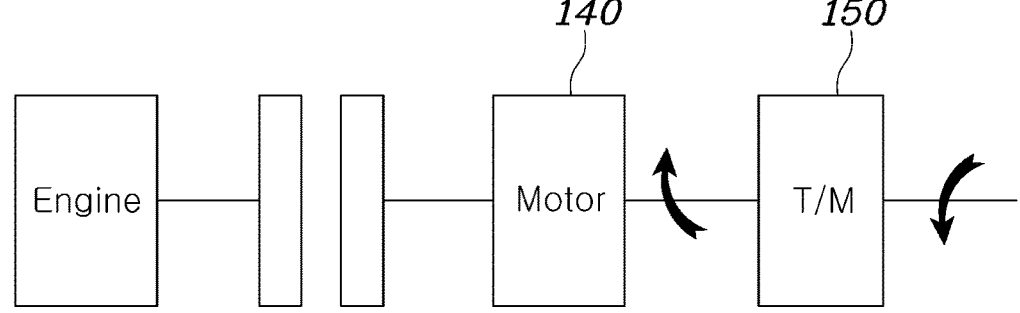
FIGS. 2A and 2B are diagrams illustrating the reverse operation of the prior art hybrid electric vehicle of FIG. 1 to which a transmission having no reverse stage is applied.
Figure 2B:
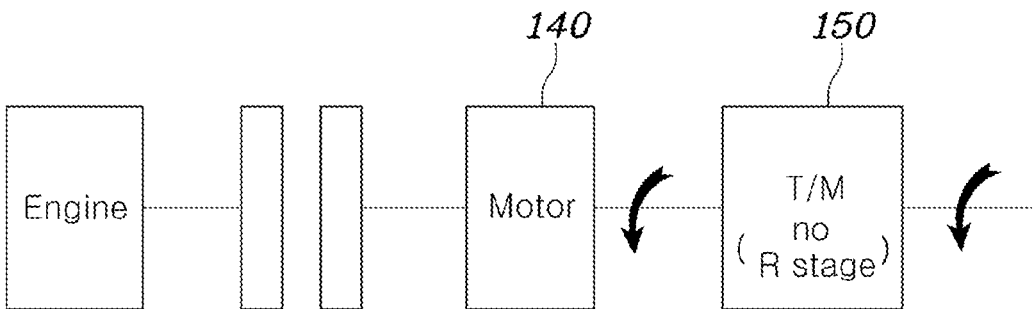

FIGS. 2A and 2B are diagrams illustrating the reverse operation scheme of the prior art general hybrid electric vehicle of FIG. 1 to which a transmission having no reverse stage is applied. In FIGS. 2A and 2B, it is assumed that the hybrid electric vehicle reverses with the engine clutch opened. A technical discussion of the general hybrid electric vehicle of FIGS. 1, 2A and 2B is provided above in the background section.

Figure 3:
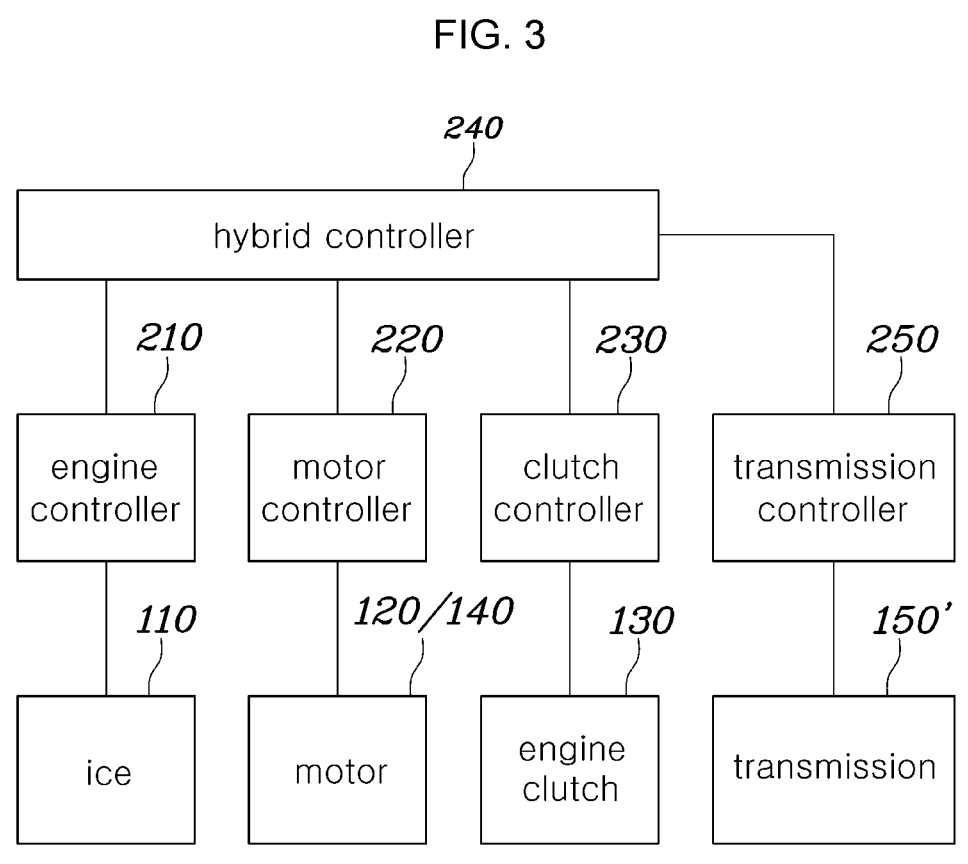

FIG. 3 illustrates an exemplary configuration of a control system of a hybrid electric vehicle according to an embodiment of the present disclosure.

As used herein, a "controller" and/or "control system" can include one or more of the following components: at least one central processing unit (CPU) configured to execute computer program instructions to perform various processes and methods, random access memory (RAM) and read only memory (ROM) configured to access and store data and information and computer program instructions, input/output (I/O) devices configured to provide input and/or output to the processing controller (e.g., keyboard, mouse, display, speakers, printers, modems, network cards, etc.), and storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium) where data and/or instructions can be stored. In addition, the controller can include antennas, network interfaces that provide wireless and/or wire line digital and/or analog interface to one or more networks over one or more network connections (not shown), a power source that provides an appropriate alternating current (AC) or direct current (DC)

to power one or more components of the controller, and a bus that allows communication among the various disclosed components of the controller. Additionally, the phrase "at least one controller" shall be understood to include the possibility of a single controller or multiple controllers performing the same or different operations.

Referring to FIG. 3, in a hybrid electric vehicle to which embodiments of the present disclosure can be applied, the internal combustion engine 110 may be controlled by an engine controller 210, the start-up generator motor 120 and the driving motor 140 may be torque-controlled by a motor controller (MCU) 220, and the engine clutch 130 may be controlled by a clutch controller 230.

Here, the engine controller 210 is also called an engine management system (EMS). In addition, the transmission 150' is controlled by a transmission controller 250.

The motor controller 220 may control a gate drive unit (not shown) with a pulse width modulation (PWM) control signal based on a motor angle, a phase voltage, a phase current, and required torque of each motor 120 or 140. Accordingly, the gate drive unit may control an inverter (not shown) that drives each of the motors 120 and 140.

Each controller may be connected to a hybrid controller (or hybrid control unit (HCU)) 240 as its upper controller that controls the overall power train including the mode switching process to provide information about engine clutch control and/or information about engine stop control, which is required during drive mode switching or gear shift under the control of the hybrid controller 240, to the hybrid controller 240 or to perform an operation according to a control signal.

For example, the hybrid controller 240 determines whether to perform switching between EV-HEV modes or CD-CS modes (in the case of PHEV) according to a vehicle driving state. To this end, the hybrid controller determines disengaging (opening) timing of the engine clutch 130, and performs hydraulic control during disengagement. In addition, the hybrid controller 240 may determine the state (Lock-up, Slip, Open, etc.) of the engine clutch 130 and control the timing of stopping the fuel injection of the engine 110. Also, the hybrid controller may transmit a torque command for controlling the torque of the first motor 120 to the motor controller 220 for engine stop control to control engine rotational energy recovery. In addition, the hybrid controller 240 may determine the state of each of drive sources 110, 120, and 140 and thus determine the required drive force to be shared by respective drive sources 110, 120, and 140, and transmit a torque command to the controllers 210 and 220 for controlling the respective drive sources in order to satisfy the required torque.

Of course, it will be apparent to those skilled in the art that the above-described connection relationship between the controllers and the function/classification of respective controllers are exemplary and are not limited by their names. For example, the hybrid controller 240 may be implemented such that the corresponding function is replaced and provided in any one of the other controllers, or the corresponding function may be distributed and provided in two or more of the other controllers.

It is obvious to those skilled in the art that the configuration of FIG. 3 described above is only one configuration example of a hybrid electric vehicle, and the hybrid electric vehicle applicable to the embodiment is not limited to this structure. However, hereinafter, for convenience of description, it is assumed that the hybrid power train to which embodiments of the present disclosure are applied is a TMED type in which a transmission 150' having no R stage as illustrated in FIG. 2B is mounted.

In one embodiment of the present disclosure, when a failure that the state of the engine clutch 130 cannot be unknown occurs, only one of the driving sources connected to one end and the other end of the engine clutch 130 is driven, and when the state of the engine clutch 130 is estimated by the rotation state of the other driving source and is determined to be in an opened state, it is proposed to allow R stage driving.

Figure 4:
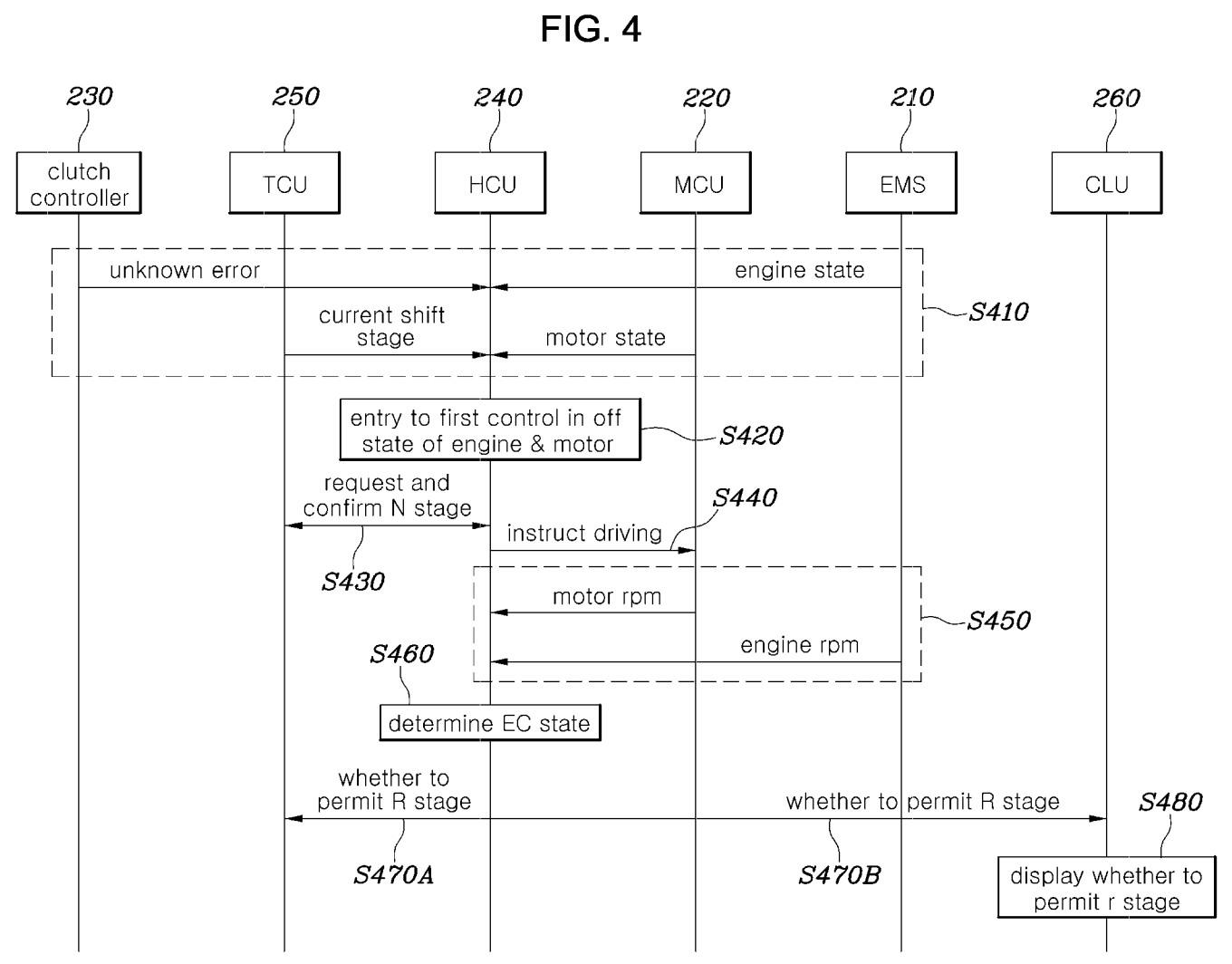

FIG. 4 illustrates an exemplary operation for each control system according to an embodiment of the present disclosure.

Referring to FIG. 4, a hybrid controller 240 may receive information about a power train state from sub controllers 210, 220, 230, and 250 (S410).

Specifically, although a clutch controller 230 may transmit the information about the engine clutch state, an engine controller 210 may transmit the starting state and an RPM of the engine 110, and a motor controller 220 may transmit the driving state and an RPM of the motor 140, and a transmission controller 250 may transmit the current shift stage, this is illustrative and not necessarily limited thereto. For example, the RPM information of the engine 110 and the RPM information of the motor 140 may be obtained through sensors respectively provided in the engine 110 and the motor 140, and vehicle speed information may further be obtained through a vehicle speed sensor, which is not illustrated. Here, it should be noted that the order in which each piece of information is received may be different from the illustrated one.

The hybrid controller 240 does not know the state of the engine clutch 130 from the received information, and entry to the control operation in a first form for determining whether to allow the shift to the R stage may be determined under the condition that the engine 110 and the motor 140 are both in an off state, a vehicle is stopped, and the current shift stage is in an N stage or P stage (S420).

Accordingly, when the current shift stage is the P stage, the hybrid controller 240 requests the transmission controller 250 to enter the N stage and confirms whether the N stage is shifted (S430).

Also, the hybrid controller 240 may request the motor controller 220 to drive the motor 140 (S440).

The hybrid controller 240 may determine the RPMs of the motor 140 and the engine 110 (S450), and may determine the state of the engine clutch 130 based on the determined RPMs (S460). Specifically, since the engine 110 is confirmed to be in the off state in step S420, and the motor 140 is controlled to be driven in step S440, if the engine clutch 130 is in an opened state, the engine 110 should be maintained in a stopped state. Accordingly, the hybrid controller 240 may determine that the engine clutch 130 is not in an opened state when the RPM of the engine 110 is greater than 0, and that the engine clutch 130 is in an opened state when the engine 110 maintains the stopped state.

According to the determination result, the hybrid controller 240 may transmit information on whether to allow the shift to the R stage to the transmission controller 250 and a cluster 260 (S470A and S470B). Here, the cluster 260 is only an example of an output device for outputting information on whether to allow the shift to the R stage, and is not necessarily limited thereto. For example, the output device for outputting information on whether to allow the shift to the R stage is not limited to any device as long as it can output information in a predetermined format, such as a display of an Audio/Video/Navigation (AVN) system, or a Head Up Display (HUD).

The transmission controller 250 may perform the first stage shift of transmission 150' when the driver selects the R stage shift through manipulation of a shift lever, a shift button, a shift dial, etc. in the case where the R stage is permitted by the hybrid controller 240, and may not perform the R stage shift if the shift is not permitted. Also, if the R stage shift is not permitted, the cluster 260 may output information (e.g., in the form of text, image, warning lamp lighting, etc.) indicating that the R stage shift is not permitted (S480).

Figure 5:
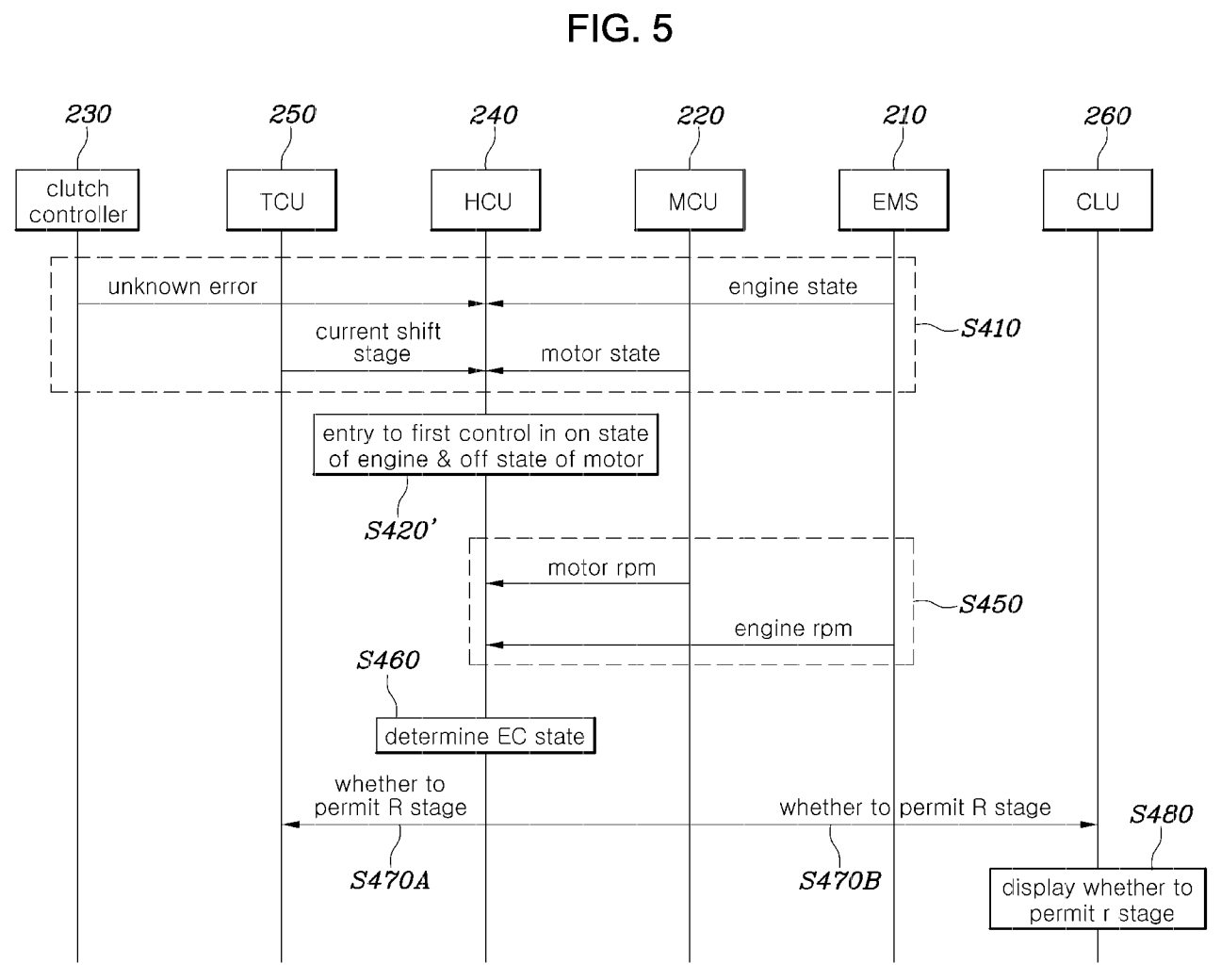

FIG. 5 illustrates another exemplary operation for each control system according to an embodiment of the present disclosure. Since the operation form illustrated in FIG. 5 is substantially similar to that of FIG. 4, the differences will be mainly described.

Referring to FIG. 5, the hybrid controller 240 that has received the vehicle operating state (S410) cannot know the state of the engine clutch 130 from the received information, and entry to the control operation in a second form for determining whether to allow the shift to the R stage may be determined under the condition that the engine 110 is in an ON state and the motor 140 is in an off state, a vehicle is stopped, and the current shift stage is in an N stage or P stage (S420').

Accordingly, the hybrid controller 240 may determine the RPMs of the motor 140 and the engine 110 (S450), and may determine the state of the engine clutch 130 based on the determined RPMs (S460). Specifically, since there is no driving control for the motor 140, if the engine clutch 130 is in an opened state, the engine 110 should be maintained in a stopped state. Accordingly, the hybrid controller 240 may determine that the engine clutch 130 is not in an opened state when the RPM of the motor 140 is greater than 0, and that the engine clutch 130 is in an opened state when the motor 140 maintains the stopped state.

Subsequent control operations (S470A, S470B, and S480) according to the determination result are the same as those described above with reference to FIG. 4, and thus a repeated description thereof will be omitted.

Figure 6:
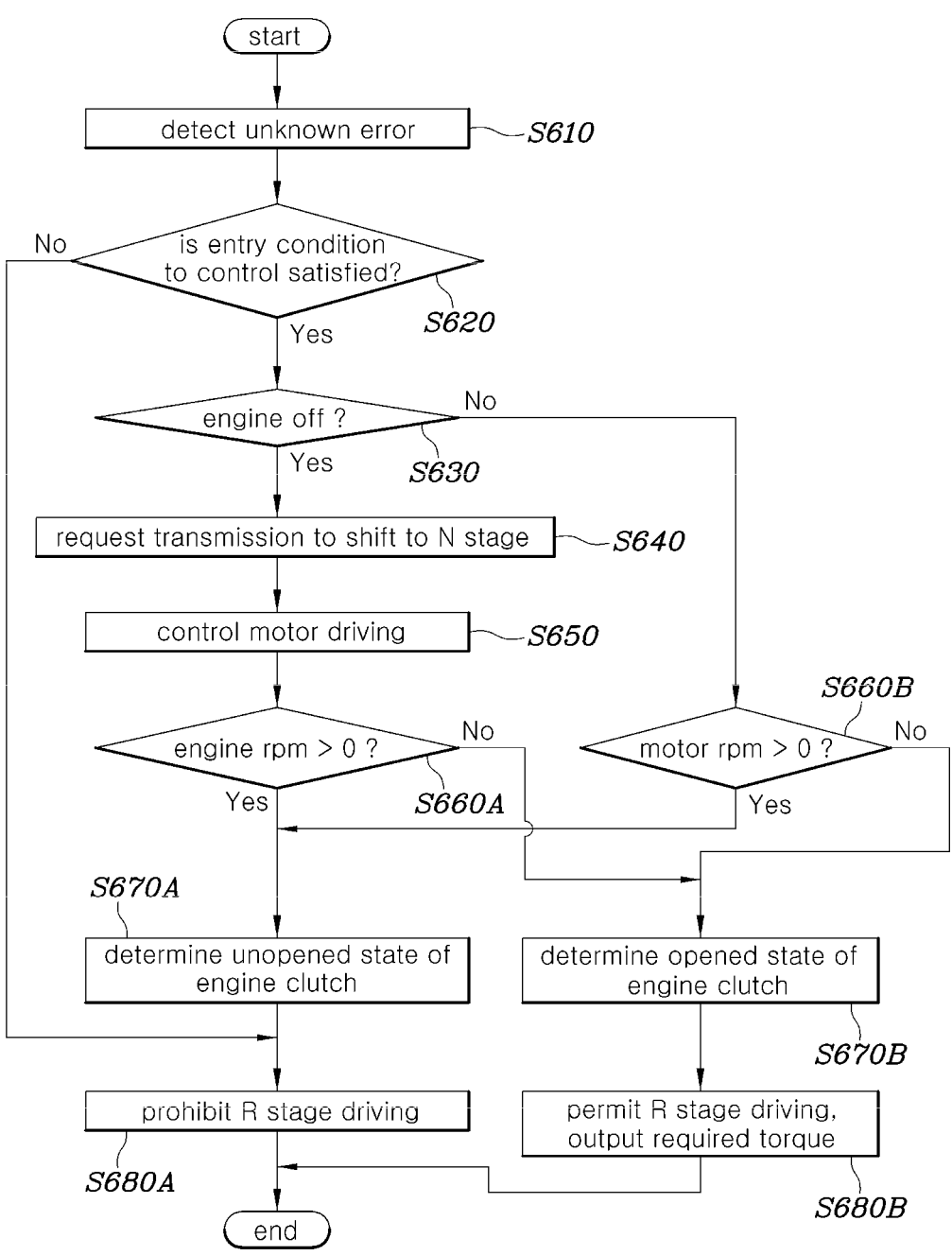
FIG. 6 is a flowchart illustrating an exemplary control process of a hybrid electric vehicle according to an embodiment of the present disclosure.

The control process described above with reference to FIGS. 4 and 5 are illustrated with a flowchart in FIG. 6.

FIG. 6 is a flowchart illustrating an exemplary control process of a hybrid electric vehicle according to an embodiment of the present disclosure.

Referring to FIG. 6, when the hybrid controller 240 detects the occurrence of a failure in which the state of the engine clutch 130 cannot be unknown (S610), the hybrid controller 240 may determine whether the entry condition to the control is satisfied (S620). Here, the entry condition to the control may be satisfied when the RPM information of the motor 140 and the engine 110 can be normally acquired (that is, the engine/motor sensor is normally operated), the state of the transmission 150 is in an N stage or P stage, and a vehicle is stopped When it is determined that the entry condition to the control is satisfied (Yes in S620), the hybrid controller 240 may request the transmission controller 250 to perform the N stage shift when the engine 110 is in an off state (Yes in S630) (S640).

When the N stage shift is confirmed through the transmission controller 250, the hybrid controller 240 may instruct the motor controller 220 to drive the motor (S650).

Thereafter, when the hybrid controller 240 checks the engine RPM and if the engine RPM is greater than 0 (Yes in S660A), the hybrid controller 240 may determine that the engine clutch 130 is not in an opened state (S670A). Accordingly, the hybrid controller 240 may prohibit the transmission controller 250 from performing the R stage shift (S680A).

Alternatively, when the engine RPM is maintained at 0, the hybrid controller 240 may determine that the engine clutch 130 is in an opened state (S670B). Accordingly, the hybrid controller 240 may allow the R stage driving, determine the required torque according to the manipulation of the accelerator pedal or for the creep torque output of the motor 140, and control the driving source accordingly (S680B).

If the engine is being driven after the entry condition to the control is determined to be satisfied (S620) (No in S630), the hybrid controller 240 may check the motor RPM (S660B). If the motor RPM is greater than 0 (Yes in S660B), the hybrid controller 240 may determine that the engine clutch 130 is not in an opened state (S670A). in addition, when the motor RPM is maintained at 0 (No in S660B), the hybrid controller may determine that the engine clutch 130 is in an opened state (S670B). Subsequent control operations (S680A, S680B) according to respective determination results (S670A, S670B) are the same as described above on the assumption that the engine is in an off state (Yes in S630), so a repeated description thereof will be omitted.

Meanwhile, in an embodiment of the present disclosure, even when, as a result of determining the state of the engine clutch 130 through the process described above with reference to FIG. 6, the engine clutch 130 is determined to be in an opened state so that the R stage driving is permitted, the state of the engine clutch 130 may be continuously monitored. This will be described with reference to FIG. 7.

Figure 7:
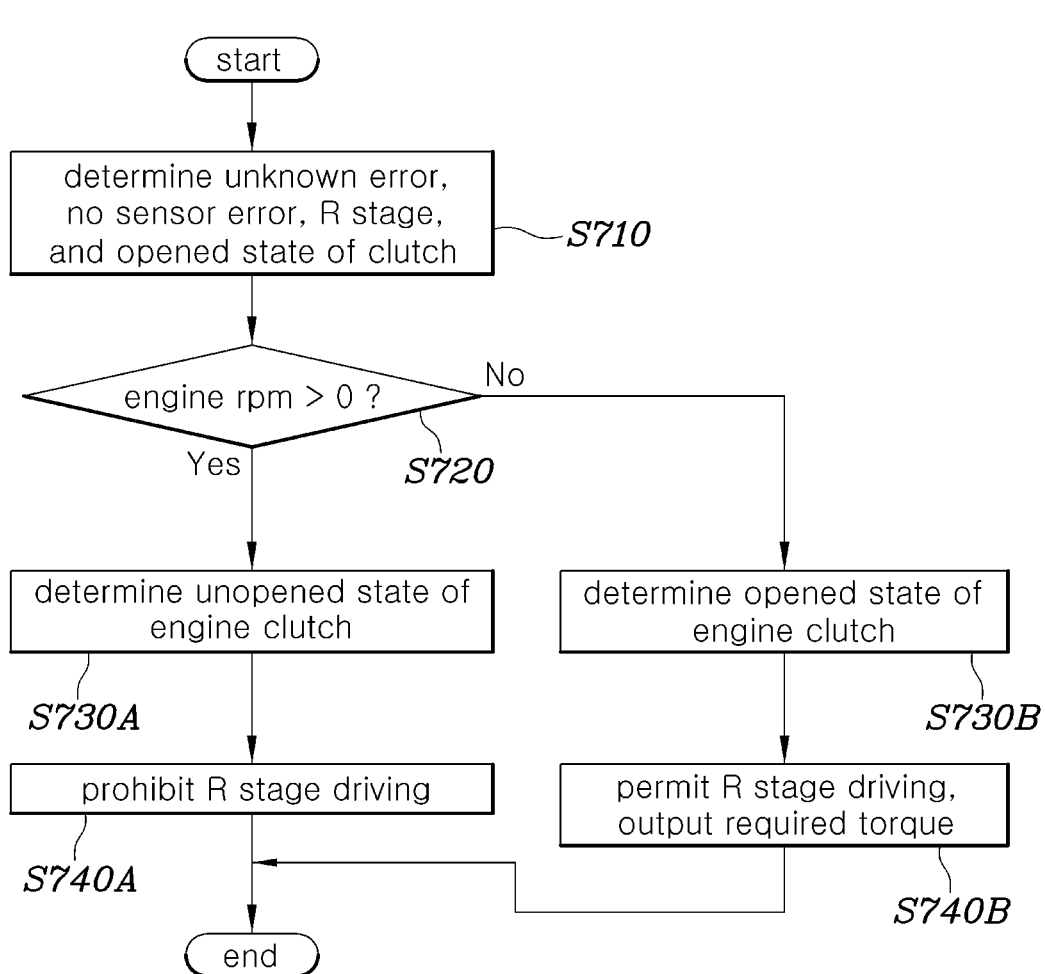
FIG. 7 is a flowchart illustrating an exemplary control process of a hybrid electric vehicle after allowing the shift to an R stage according to an embodiment of the present disclosure.

FIG. 7 is a flowchart illustrating an exemplary control process of a hybrid electric vehicle after allowing the shift to an R stage according to an embodiment of the present disclosure. FIG. 7 assumes a situation after step S680B of FIG. 6.

Referring to FIG. 7, the hybrid controller 240 has previously determined that the engine clutch 130 is in an opened state even though the state of the engine clutch 130 cannot be still unknown, and may check the engine RPM (S720) when there is no abnormality in other sensors, and the R stage is currently selected (S710).

If the engine RPM is greater than 0 (Yes in S720), the hybrid controller 240 may determine that the engine clutch 130 is not in an opened state (S730A), and may prohibit the R stage driving (S740A). On the other hand, when the engine 110 is in a stopped state (No in S720), the hybrid controller 240 may determine that the engine clutch 130 is in an opened state (S730B) and may continue to allow the R stage driving (S740B).

Through continuous monitoring during the above-mentioned R stage driving, the engine reverse rotation or the forward movement during the R stage selection can be prevented more reliably.

In the above-described embodiments, only one of the engine 110 and the motor 140 is driven in a state in which the wheel and the driving source are separated (i.e., N stage or P stage) to determine the state of the engine clutch 130, and then it is determined whether the other rotates. On the other hand, according to another implementation, the state of the engine clutch 130 may be determined to be in an unopened stage when there is an open fail diagnosis in which the engine clutch 130 is unsuccessfully released or in the case of a launch (or limhome) situation in which a vehicle moves forward through slip of the transmission 150 in a state in which the engine clutch 130 is connected.

In addition, although the above-described embodiments assumes the hybrid power train as illustrated in FIG. 1, in the hybrid power train in which a motor performing a function corresponding to the start-up generator motor 120 is directly connected to the engine 110, the state of the engine clutch 130 can be estimated only by the motor. This will be described with reference to FIG. 8.

Figure 8:
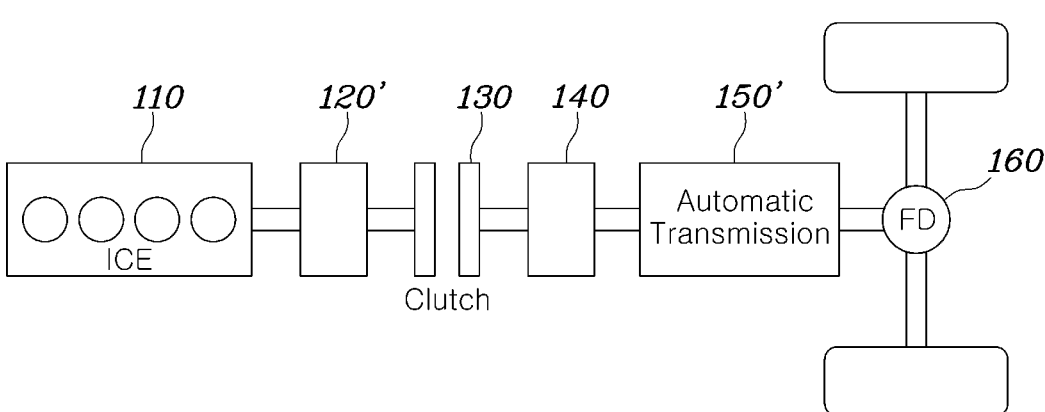
FIG. 8 illustrates an exemplary structure of a power train of a hybrid electric vehicle according to another embodiment.

FIG. 8 illustrates an exemplary structure of a power train of a hybrid electric vehicle according to another embodiment.

In the hybrid power train illustrated in FIG. 8, a motor 120' is directly connected to the engine 110 between engine clutch 130 and the engine 110. In this structure, if the engine clutch 130 is not in an opened state, when any one of the motor 120' disposed at one end of the engine clutch 130 and the motor 140 disposed at the other end of the engine clutch 130 is being driven, the other also rotates. Accordingly, the hybrid controller 240 may instruct the motor controller 220 to drive either one of the two motors 120' and 140, and monitor the RPM of the other to determine whether the engine clutch 130 is in an opened state.

On the other hand, the present disclosure described above can be implemented as computer-readable codes on a medium in which a program is recorded. The computer-readable medium includes all types of recording devices in which data readable by a computer system is stored. Examples of computer-readable media include Hard Disk Drive (HDD), Solid State Disk (SSD), Silicon Disk Drive (SDD), ROM, RAM, CD-ROM, magnetic tape, floppy disk, optical data storage device, etc. Accordingly, the above detailed description should not be construed as restrictive in all respects, but as exemplary. The scope of the present disclosure should be determined by a reasonable interpretation of the appended claims, and all modifications within the equivalent scope of the present disclosure are included in the scope of the present disclosure.

What is claimed is:

1. A method of controlling a hybrid electric vehicle including a transmission omitting an R (reverse) stage gear, the method comprising:

when a state of an engine clutch is unknown by a hybrid controller of the hybrid electric vehicle, determining, by the hybrid controller, that a preset condition for control of the engine clutch is satisfied, wherein the preset condition includes the transmission being in an N stage gear or a P stage gear;

after determining that the preset condition is satisfied when the state of the engine clutch is unknown:

driving, by the hybrid controller, one of a first driving source disposed at a first end of the engine clutch or a second driving source disposed at a second end of the engine clutch;

determining a result based on whether the other one of the first driving source and the second driving source that is not being driven by the driving step rotates;

determining whether the engine clutch is opened depending on the determined result; and prohibiting driving in reverse when the engine clutch is determined to be unopened.

2. The method according to claim 1, further comprising: allowing driving in reverse when the engine clutch is determined to be opened.

3. The method according to claim 1, wherein the preset condition further includes (a) the rotation speeds of the first driving source and the second driving source are able to be determined and (b) the first driving source and the second driving source are stopped.

4. The method according to claim 1, wherein the first driving source includes an engine and the second driving source includes a driving motor, and when the engine is being driven while the preset condition is satisfied, determining the result further comprises determining whether the driving motor rotates.

5. The method according to claim 4, wherein when both the engine and the driving motor are stopped, the driving step further comprises driving the driving motor.

6. The method according to claim 5, further comprising: controlling the transmission to be in the N stage gear before driving the driving motor.

7. The method according to claim 1, wherein the first driving source includes a first motor directly connected to the engine, and the second driving source includes a second motor connected to the transmission.

8. The method according to claim 1, further comprising outputting the determined result about the opening state of the engine clutch in a predetermined form.

9. A non-transitory computer-readable recording medium storing a computer executable program containing instructions thereon for executing the method of controlling the hybrid electric vehicle according to claim 1.

10. A hybrid electric vehicle comprising:

a transmission omitting an R (reverse) stage gear;

an engine clutch;

a first driving source disposed at a first end of the engine clutch;

a second driving source disposed at a second end of the engine clutch; and at least one controller configured to, when a state of the engine clutch is unknown by the at least one controller, and after a preset condition for control of the engine clutch is determined to be satisfied:

drive one of the first driving source or the second driving source, determine whether the engine clutch is in an open state based on a rotation state of the other one of the first driving source and the second driving source that is not being driven; and prohibit driving in reverse when the engine clutch is determined to be in an unopened state;

wherein the preset condition includes the transmission being in an N stage gear or a P stage gear.

11. The hybrid electric vehicle according to claim 10, wherein the at least one controller is further configured to allow driving in reverse when the engine clutch is determined to be opened.

12. The hybrid electric vehicle according to claim 11, wherein the at least one controller is further configured to re-determine, after allowing driving in reverse, whether the engine clutch is opened based on the rotation state of the first driving source in response to the driving of the second driving source.

13. The hybrid electric vehicle according to claim 10, wherein the preset condition further comprises (a) the rotation speeds of the first driving source and the second driving source are able to be determined, and (b) the first driving source and the second driving source are stopped.

14. The hybrid electric vehicle according to claim 10, wherein the first driving source includes an engine, and the second driving source includes a driving motor, and when the engine is being driven in a state where the preset condition is satisfied, the at least one controller is further configured to determine whether the engine clutch is in the open state based on the rotation state of the driving motor.

15. The hybrid electric vehicle according to claim 14, wherein the first controller is further configured to drive the driving motor when both the engine and the driving motor are in a stopped state.

16. The hybrid electric vehicle according to claim 15, wherein the at least one controller is configured to control the transmission to shift to the N stage gear before driving the driving motor.

17. The hybrid electric vehicle according to claim 10, wherein the first driving source includes a first motor directly connected to the engine, and the second driving source includes a second motor connected to the transmission.

18. The hybrid electric vehicle according to claim 10, further comprising an output device configured to output the determination of the open state of the engine clutch in a predetermined form.

\* \* \* \* \*